(12) United States Patent
Henderson et al.

(10) Patent No.: US 9,310,481 B2
(45) Date of Patent: Apr. 12, 2016

(54) WIDE BAND CLEAR AIR SCATTER DOPPLER RADAR

(71) Applicant: LogLinear Group, LLC, Waveland, MS (US)

(72) Inventors: Mark Henderson, Kiln, MS (US); Marshall Bradley, Slidell, LA (US)

(73) Assignee: LogLinear Group, LLC, Waveland, MS (US)

( * ) Notice: Subject to any disclaimer, the term of this patent is extended or adjusted under 35 U.S.C. 154(b) by 281 days.

(21) Appl. No.: 13/801,778

(22) Filed: Mar. 13, 2013

(65) Prior Publication Data

US 2013/0321200 A1    Dec. 5, 2013

Related U.S. Application Data

(60) Provisional application No. 61/653,882, filed on May 31, 2012.

(51) Int. Cl.
*G01S 13/95*    (2006.01)
*G01S 13/58*    (2006.01)

(52) U.S. Cl.
CPC ............ *G01S 13/951* (2013.01); *G01S 13/583* (2013.01); *G01S 13/589* (2013.01)

(58) Field of Classification Search
CPC .......................................... G01S 13/95–13/958
USPC ................. 342/26 R, 26 A, 26 B, 26 C, 26 D
See application file for complete search history.

(56) References Cited

U.S. PATENT DOCUMENTS 3,162,828 A * 12/1964 Schmidt et al. ............... 333/137
3,427,581 A *  2/1969 Hartman ........................ 340/968
3,980,974 A *  9/1976 Yamamoto et al. ............. 333/33
4,633,256 A * 12/1986 Chadwick ..................... 342/368
4,647,933 A *  3/1987 Hogg .......................... 342/26 D (Continued)

FOREIGN PATENT DOCUMENTS

WO    2013181246 A1    12/2013

OTHER PUBLICATIONS

International Search Report and Written Opinion for International Application PCT/US2013/043106, International Filing Date May 29, 2013, Report Completed Aug. 1, 2013, mailed Aug. 13, 2013, 8 pgs.

(Continued)

*Primary Examiner* — Peter Bythrow
(74) *Attorney, Agent, or Firm* — KPPB LLP

(57) ABSTRACT

Systems and methods for measuring wind speed and direction in clear air conditions using a wide band Doppler radar in accordance with embodiments of the invention are disclosed. In one embodiment of the invention, a wide band Doppler radar system includes an antenna assembly includes at least one transmit antenna and at least one receive antenna; a transceiver connected to the antenna assembly configured to transmit a radar beam includes a transmit signal on a Ka-band carrier frequency and receive a backscattered radar beam includes a carrier frequency that is frequency shifted relative to the transmitted Ka-band carrier frequency of the backscattered radar beam; a data acquisition system connected to the transceiver configured to estimate a wind velocity vector by calculating a Doppler shift between at least one transmitted radar beam and at least one received backscattered radar beam.

20 Claims, 7 Drawing Sheets

(56) References Cited

U.S. PATENT DOCUMENTS

| | | | | |
|---|---|---|---|---|
| 4,831,874 A * | 5/1989 | Daubin et al. | | 73/489 |
| RE33,152 E * | 1/1990 | Atlas | | 342/26 R |
| 4,965,573 A * | 10/1990 | Gallagher et al. | | 340/968 |
| 5,122,805 A * | 6/1992 | Peterman | | G01S 13/951 |
| | | | | 342/196 |
| 5,262,782 A * | 11/1993 | Rubin et al. | | 342/26 D |
| 5,434,570 A * | 7/1995 | Wurman | | 342/26 D |
| 5,534,868 A * | 7/1996 | Gjessing | | G01S 13/951 |
| | | | | 342/26 D |
| 5,544,525 A * | 8/1996 | Peterman et al. | | 73/170.13 |
| 5,568,151 A * | 10/1996 | Merritt | | 342/192 |
| 5,583,972 A * | 12/1996 | Miller | | 345/419 |
| 5,592,171 A * | 1/1997 | Jordan | | 342/26 D |
| 5,623,267 A * | 4/1997 | Wurman | | 342/26 D |
| 5,648,782 A * | 7/1997 | Albo et al. | | 342/26 D |
| 5,744,710 A * | 4/1998 | Abatzoglou et al. | | 73/170.11 |
| 6,018,307 A * | 1/2000 | Wakayama et al. | | 342/26 D |
| 6,081,220 A * | 6/2000 | Fujisaka et al. | | 342/26 D |
| 6,097,329 A * | 8/2000 | Wakayama | | 342/26 D |
| 6,232,913 B1 * | 5/2001 | Lehtinen | | 342/137 |
| 6,307,500 B1 * | 10/2001 | Cornman et al. | | 342/26 R |
| 6,377,204 B1 * | 4/2002 | Wurman et al. | | 342/59 |
| 6,427,531 B1 * | 8/2002 | Chintawongvanich | | 73/170.13 |
| 6,456,227 B2 * | 9/2002 | Wada et al. | | 342/26 R |
| 6,480,142 B1 * | 11/2002 | Rubin | | 342/26 R |
| 6,535,158 B2 * | 3/2003 | Wilkerson et al. | | 342/26 D |
| 6,646,587 B2 * | 11/2003 | Funai | | 342/26 R |
| 6,856,273 B1 * | 2/2005 | Bognar | | G01F 1/66 |
| | | | | 342/26 D |
| 7,049,997 B2 * | 5/2006 | Alford et al. | | 342/26 R |
| 7,218,279 B2 * | 5/2007 | Salmivaara et al. | | 342/374 |
| 7,564,421 B1 * | 7/2009 | Edwards et al. | | 343/776 |
| 7,688,249 B2 * | 3/2010 | Fischer et al. | | 342/26 R |
| 8,009,080 B2 * | 8/2011 | Mizutani et al. | | 342/26 R |
| 8,077,074 B2 * | 12/2011 | Venkatachalam et al. | | 342/59 |
| 8,085,181 B2 * | 12/2011 | Gekat | | 342/26 R |
| 8,098,188 B2 * | 1/2012 | Costes et al. | | 342/25 R |
| 8,248,321 B2 * | 8/2012 | Anderson et al. | | 343/786 |
| 8,354,950 B2 * | 1/2013 | Kemkemian et al. | | 342/26 R |
| 2002/0005798 A1 * | 1/2002 | Wada et al. | | 342/26 |
| 2003/0137964 A1 * | 7/2003 | Suenaga et al. | | 370/342 |
| 2010/0141527 A1 * | 6/2010 | Lalezari | | 342/368 |
| 2010/0214185 A1 * | 8/2010 | Sammoura et al. | | 343/776 |

OTHER PUBLICATIONS

International Preliminary Report on Patentability for International Application PCT/US2013/043106, completed Aug. 1, 2013, Mailed Dec. 11, 2014, 7 Pgs.

Barton, "Radar Equations for Modern Radar, Chapter 1, Development of the Radar Equations", 2013, Arctech House, pp. 2-7.

Blake, "Radar Range-Performance Analysis", 1990, Munro Publishing Co., pp. 7, 19-20, 301.

Coulson, "Waves a Mathematical approach to the common types of wave motion, Wave propagation in an inhomogeneous medium", 1977, The Longman Group, pp. 171-174.

Kingston, "Optical Sources, Detectors and Systems, Fundamentals and Applications", 1995, Academic Press, Section 7.4, pp. 161-162.

Nathanson et al., "Radar Design Principles, Signal Processing and the Environment", 1995, SciTech Publishing, Inc. pp. 8-9, 234, 239.

Ottersten, "Radar backscattering from the turbulent clear atmosphere", Radio Science, Dec. 1969, vol. 4, No. 12, pp. 1251-1255.

Rees, "Physical Principles of Remote Sensing", 1990, Cambridge University Press, pp. 148-149.

Richards, "Fundamentals of Radar Signal Processing, Chapter 2, Signal Models", 2005, McGraw-Hill, pp. 88-92.

* cited by examiner

WIDE BAND CLEAR AIR SCATTER DOPPLER RADAR

CROSS-REFERENCE TO RELATED APPLICATIONS

The current application claims priority to Provisional Patent Application No. 61/653,882, entitled "WIDE BAND CLEAR AIR SCATTER DOPPLER RADAR", filed May 31, 2012, the disclosure of which is incorporated herein by reference.

FIELD OF THE INVENTION

The present invention generally relates to radars and more specifically to systems and methods for measuring wind speed and direction using Doppler radars.

BACKGROUND

Wind profilers can detect wind speed and direction (i.e. velocity) at various altitudes using radars and are typically used for meteorological forecasting and flight planning. Radar based wind profilers can measure wind velocity by observing scattering effects on radio waves due to micro-hydrometers including fog, clouds, and/or mist—so called dull weather phenomena and suspended particles including (but not limited to) thick dust and insets.

Further, radar based systems can detect wind speed and direction by observing the so called Bragg Scattering phenomena caused by natural atmospheric turbulence in the atmosphere. Wind profiling radars typically operate at frequencies near 50 MHz, 400 MHz and 900 MHz because Bragg Scattering conditions are dominate at these relatively lower frequencies. However, Bragg Scattering effects are relatively faint even at these lower frequencies and radars have traditionally relied on larger integration times, larger range cells, and larger antenna arrays to make measurements.

Clear air scatterers (CAS) are small turbulent motions of air associated with ever-present hydrodynamic-thermodynamic instabilities in the atmosphere during clear weather conditions. Such small turbulent motions can track the mean velocity of a volume of wind and exist long enough to reliable detected. Further CAS have a defined nature and are prevalent in the convective boundary layer (CBL) where wind speed and direction measurements are particular useful for meteorological forecasting and/or flight planning. However, CAS in the CBL have very small returns (reflected energy), often two orders of magnitude smaller than returns for fog or clouds and conventional thinking has been that radar's operating in the centimeter to millimeter range in clear weather conditions could not obtain a useable return due to the varying and often small concentrations of CAS.

SUMMARY OF THE INVENTION

Systems and methods for measuring wind speed and direction in clear air conditions using a wide band Doppler radar in accordance with embodiments of the invention are disclosed. In one embodiment, a wide band Doppler radar system includes an antenna assembly includes at least one transmit antenna and at least one receive antenna, where each of the at least one transmit antenna is configured to transmit a radar beam includes a transmit signal on a Ka-band carrier frequency and each of the at least one receive antenna is configured to receive a backscattered radar beam includes a carrier frequency that is frequency shifted relative to the transmitted Ka-band carrier frequency of the backscattered radar beam; a transceiver connected to the antenna assembly configured to transmit a radar beam includes a transmit signal on a Ka-band carrier frequency using each of the at least one transmit antenna and receive a backscattered radar beam includes a carrier frequency that is frequency shifted relative to the transmitted Ka-band carrier frequency of the backscattered radar beam using each of the at least one receive antenna; a data acquisition system connected to the transceiver configured to estimate a wind velocity vector by calculating a Doppler shift between at least one transmitted radar beam and at least one received backscattered radar beam.

In a further embodiment, the antenna assembly also includes a horn antenna having waveguide flanges.

In another embodiment, the transceiver operates between 33.3 GHz and 33.5 GHz.

In a still further embodiment, the transceiver operates as a frequency modulated continuous wave (FMCW) radar.

In still another embodiment, the antenna assembly also includes 4 transmit antennas.

In a yet further embodiment, the antenna assembly also includes 4 receive antennas.

In yet another embodiment, the transceiver connected to the antenna assembly is also configured to transmit radar beams that separated by 90 degrees in azimuth.

In a further embodiment again, the transceiver connected to the antenna assembly is also configured to transmit radar beams that tilted 80 degrees up from the horizontal.

In another embodiment again, the wide band Doppler radar system is stationary while in operation.

In a further additional embodiment, the wide band Doppler radar system is pointed north while in operation.

In another additional embodiment, transmitting a radar beam includes a transmit signal on a Ka-band carrier frequency also includes operating between 33.3 GHz and 33.5 GHz.

In a still yet further embodiment, transmitting a radar beam includes a transmit signal on a Ka-band carrier frequency also includes generating a continuous wave.

DETAILED DISCLOSURE OF THE INVENTION

Turning now to the drawings, systems and methods for measuring wind speed and direction in clear air conditions using a wide band Doppler radar are described. A wide band Doppler radar system includes an antenna assembly comprising of at least one transmit antenna and at least one receive antenna. The transmit antennas are configured to transmit a radar beam having a direction and comprising a transmit signal on a Ka-band (27-40 GHz) carrier frequency. The receive antennas are configured to receive a backscattered radar beam comprising a carrier frequency that is frequency shifted relative to the transmitted Ka-band carrier frequency of the backscattered radar beam.

In many embodiments, the system includes a transceiver connected to the antenna assembly and configured to transmit a radar beam comprising a transmit signal on the Ka-band carrier frequency using a transmit antenna. The transceiver is further configured to receive the backscattered radar beam comprising a carrier frequency that is frequency shifted relative to the transmitted Ka-band carrier frequency of the backscattered radar beam using a receive antenna.

In several embodiments, the system includes a data acquisition system connected to the transceiver and configured to estimate a wind velocity vector by calculating a Doppler shift between at least one transmitted radar beam and at least one received backscattered radar beam.

In various embodiments, the system includes using multiple radar beams that can be separated by a predetermined angle with each radar beam tilted relative to the horizontal plane. Each radar beam can illuminate a volume of air in order to determine the wind speed and direction. In several embodiments, the system can be implemented where the radar is stationary or in motion. When the radar is stationary and/or pointing north, the wind velocity vector can be estimated more readily. In many embodiments, the system generates a range-velocity matrix using range measurements (distance between the radar and the illuminated volume of air) and the calculated Doppler shifts between at least one transmit radar beam and backscattered radar beam. In many embodiments, an observed radar beam Doppler shift velocity at various altitudes of interest can be estimated using the range-velocity matrix. Systems and methods for measuring wind speed and direction in clear air conditions using a wide band Doppler radar in accordance with embodiments of the invention are further discussed below.

Wide Band Doppler Radar System Architecture

Figure 1:
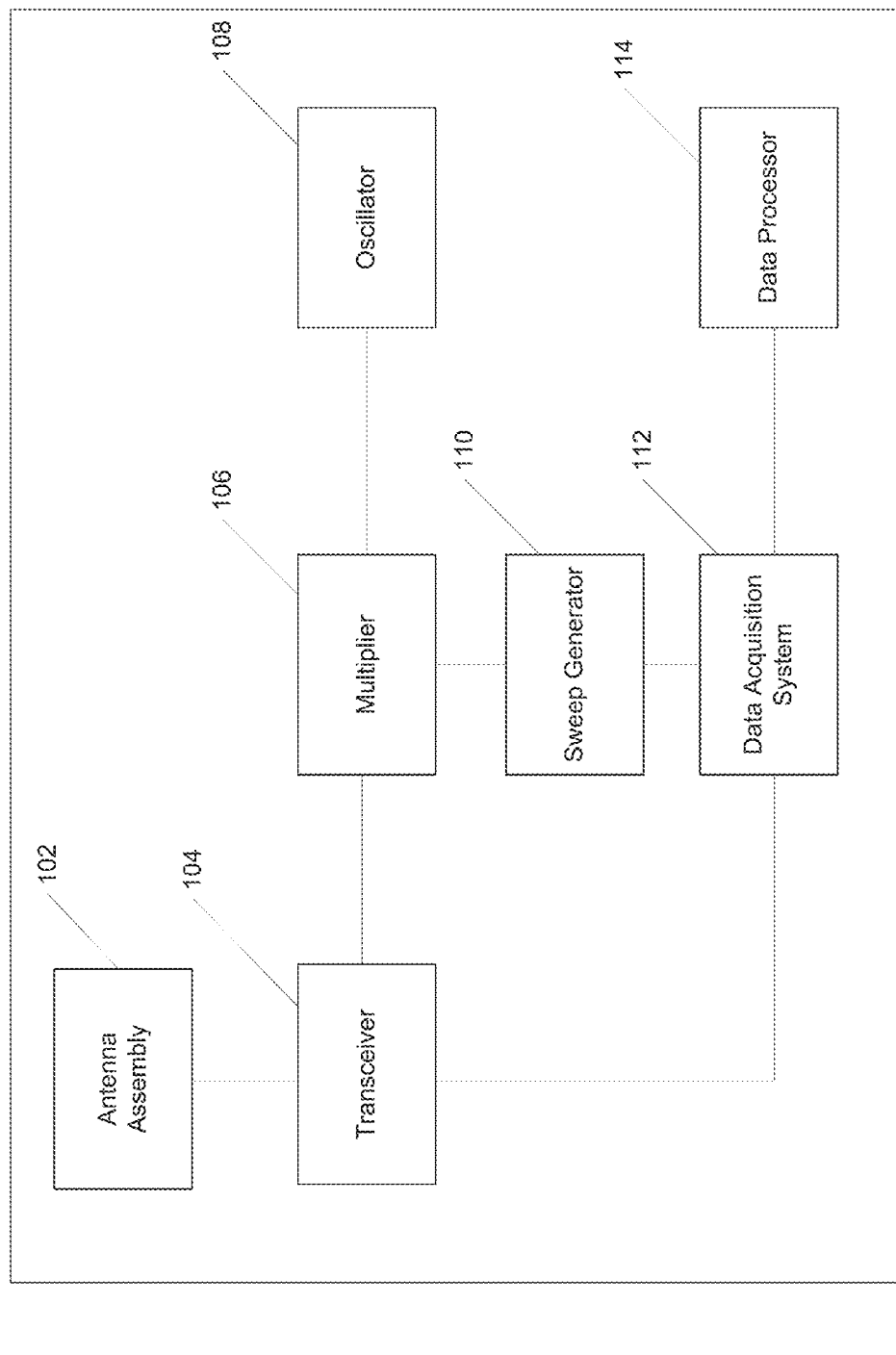
FIG. 1 is a block diagram of a wide band Doppler radar system for transmitting a radar beam comprising a transmit signal on a Ka-band carrier frequency and receiving a frequency shifted backscattered radar beam and estimating a wind velocity vector by calculating a Doppler shift in accordance with an embodiment of the invention.

Wide band Doppler radar systems in accordance with embodiments of the invention can be utilized for measuring wind speed and direction (i.e. wind velocity). A wide band Doppler radar system in accordance with an embodiment of the invention is illustrated in FIG. 1. The wide band Doppler radar system 100 includes an antenna assembly 102 comprising of separate transmit and receive antennas. In many embodiments, the antenna can be a horn antenna with a measured gain of 31 dBi having waveguide flanges. In several embodiments, the receive antenna can have a low noise amplifier on the flange. In various embodiments, the antenna assembly can be replaced with a single antenna solution, combined with a low leakage circulator and a reflected power canceller before the low noise amplifier. In other embodiments, the antenna assembly can be any high gain antenna or antenna system, with an antenna gain near 30 dBi or above. In many embodiments, the antennas can be 150 mm in diameter. Generally, larger antennas can improve the system performance but the maximum size of the antennas can be limited by the applications tolerance for size and weight of the antenna assembly.

In many embodiments, the antenna assembly is connected to a transceiver 104 with waveguide components. In several embodiments, the transceiver operates between 33.3 GHz and 33.5 GHz, with a maximum transit bandwidth of 200 MHz. The operating frequency is not limited to 33.3 GHz to 33.5 GHz as system performance does not significantly alter though the K (18-27 GHz) and Ka (26.5-40 GHz) bands. In various embodiments, a standard operating mode for the transceiver can be 33.4-33.5 GHz for range cells between 3 to 12.5 meters. Additional performance can be gained by using range cells that are smaller than 3 m since the coherence length of CAS are quite small. In many embodiments, the output power of the transceiver can be 34 dBm. In some embodiments, the combination of radar output power and antenna gain can be greater than 50 dB. In several embodiments, the transceiver operates as a frequency modulated continuous wave (FMCW) radar.

The system also includes a low noise oscillator 108 used to generate a system clock and the Ka-band carrier frequency for the transmit signal. In many embodiments, the oscillator produces a 200 MHz system clock that can start with phase noise less than 120 dB at 100 Hz offset from the carrier. The system also includes a multiplier 106 connected to the oscillator 108. In several embodiments, the system clock can be multiplied by five to generate a 1 GHz clock signal. In various embodiments, the 1 GHz clock signal can be further multiplied by 16 to create a 16 GHz clock source where the phase noise of the 1 GHz and 16 GHz clock signals are near theoretical limits with offsets of less than 3 dB+20 log N.

The multiplier is connected to a sweep generator 110. In many embodiments, a direct digital synthesized swept frequency waveform can be created based on a low noise 1 GHz synchronous clock. In several embodiments, the swept waveform starts at 400 MHz and sweeps up to 500 MHz where the signal can then be mixed against the 1 GHz clock signal to 1.4 GHz to 1.5 GHz. In various embodiments, the signal can be filtered and mixed against the 16 GHz clock signal in a sub-harmonic mixer. The output can be selected that sweeps from 33.4-33.5 GHz. Other means for generating the sweep can be employed so long as the sweep linearity is sufficient to resolve the CAS targets in accordance with embodiments of the invention.

The sweep generator is connected to a data acquisition system 112 that is synchronized to the system clock and samples the received backscattered signal waveform. In many embodiments, digital data is generated from sampling the received backscattered signal and the generated transmit signal and presented to a data processor 114 that is connected to the data acquisition system. The data processor processes the data to extract both velocity and range information as further discussed below where the extracted information can provide range and velocity estimates on each radar beam.

Although specific wide band Doppler radar systems for measuring wind speed and direction are discussed above with respect to FIG. 1, any of a variety of wide band Doppler radar systems as appropriate to the requirements of a specific application can be utilized in accordance with embodiments of the invention. Processes for estimating a wind velocity vector using Doppler shift calculations in accordance with an embodiment of the invention are further discussed below.

Estimating a Wind Velocity Vector Using Doppler Shift Calculations

Figure 2:
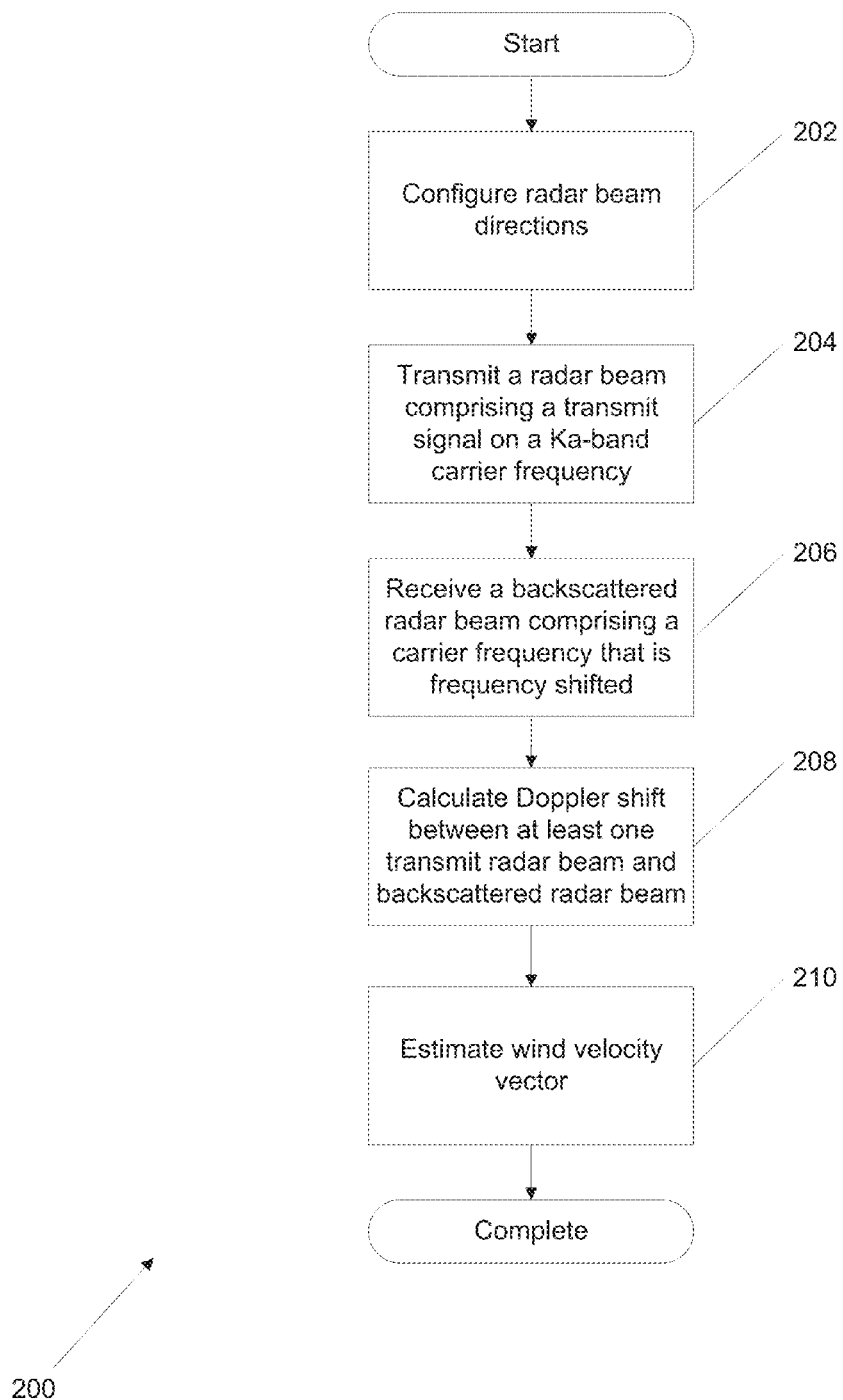
FIG. 2 is a flow chart illustrating a process for estimating a wind velocity vector utilizing Doppler shift calculations between at least one transmit radar beam and a backscattered radar beam in accordance with an embodiment of the invention.

The wind velocity vector $V_{wind}=(v_x, v_y, v_z)$ provides both wind speed and direction at an observed altitude. A process for estimating a wind velocity vector by utilizing Doppler shift calculations in accordance with an embodiment of the invention is illustrated in FIG. 2. The process 200 includes configuring (202) radar beam directions as further discussed below. The process also includes transmitting (204) a radar beam comprising of a transmit signal on a Ka-band carrier frequency using the antenna assembly as discussed above. In many embodiments, the transmit signal can illuminate CAS in the CBL creating a backscatter reflective signal. The process further includes receiving a backscattered radar beam comprising a carrier frequency that is frequency shifted relative to the transmitted Ka-band carrier frequency of the backscattered radar beam. Using the transmit radar beam and the backscattered radar beam, a Doppler shift is calculated (206). In several embodiments, a Doppler shift is calculated for multiple radar beams as further described below. In many embodiments, a wind velocity vector is estimated (210) using the methods further described below.

Although specific processes for estimating a wind velocity vector by utilizing Doppler shift calculations are discussed above with respect to FIG. 2, any of a variety of processes for estimating a wind velocity vector by utilizing Doppler shift calculations can be utilized in accordance with embodiments of the invention. Processes for configuring radar beam directions in accordance with an embodiment of the invention are discussed further below.

Configuring Radar Beam Directions

Figure 3:
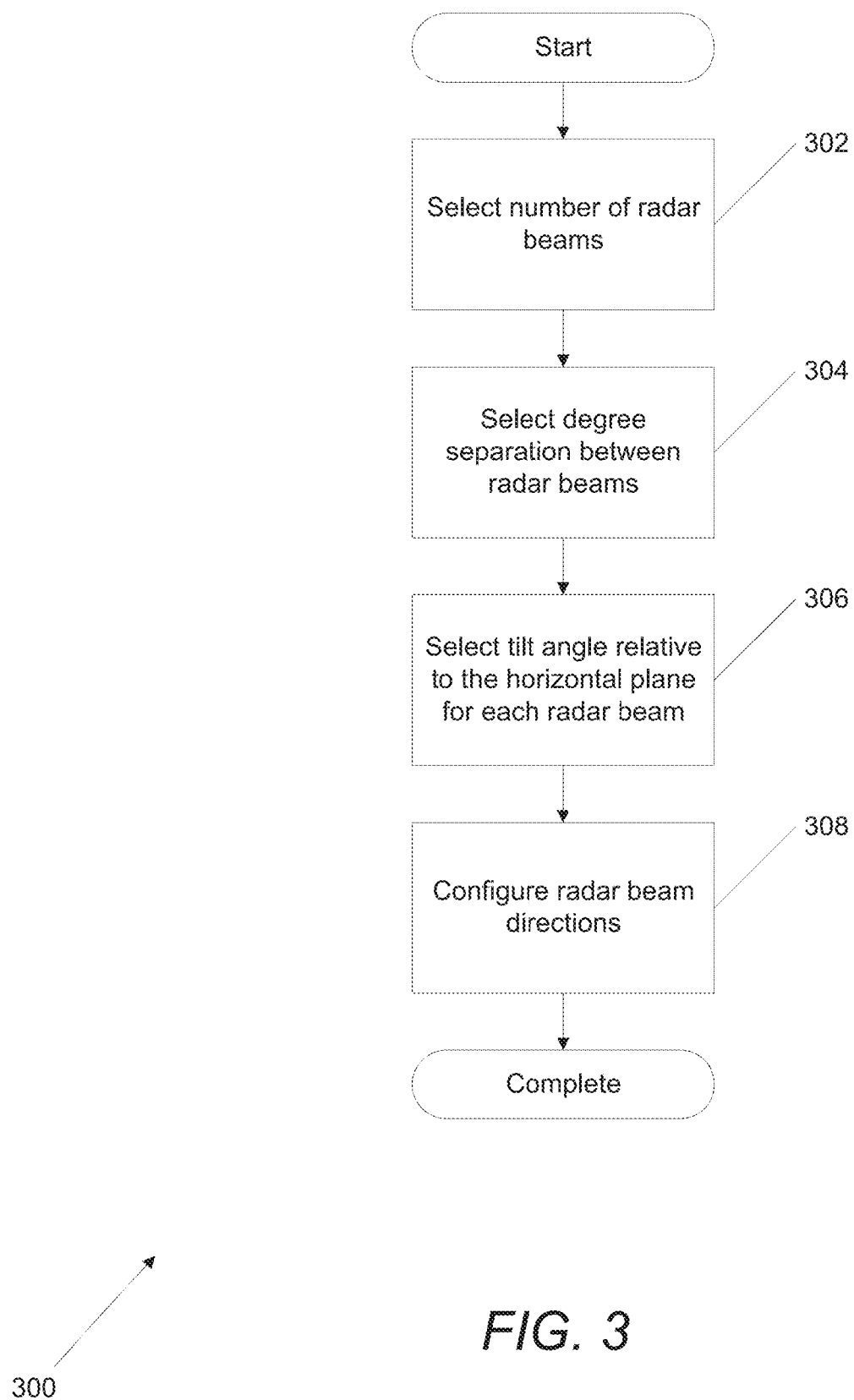
FIG. 3 is a flow chart illustrating a process for configuring radar beam directions for collecting data to for Doppler shift calculations in accordance with an embodiment of the invention.

Radar beam directions directly impact a Doppler radar system's ability to collect information regarding wind speed and direction. In many embodiments, the individual radar beams work in conjunction in order to create a wind profile comprising of the wind speed and direction at various altitudes. A process for configuring radar beam directions in accordance with an embodiment of the invention is illustrated in FIG. 3. The process 300 includes selecting (302) a number of radar beams corresponding to the number of active pairs of transmit and receive antennas. In many embodiments, four radar beams are selected. The process further includes selecting a degree of separation between the radar beams. In several embodiments, four selected beams are separated by 90 degrees in azimuth. Further, a tilt angle is selected (306) relative to the horizontal plane for each radar beam. In various embodiments, each radar beam is tilted 80 degrees up (or down) from the horizontal. The radar beam directions are configured (308) based on the number of radar beams, degree separation and tilt angles as discussed above.

Figure 4:
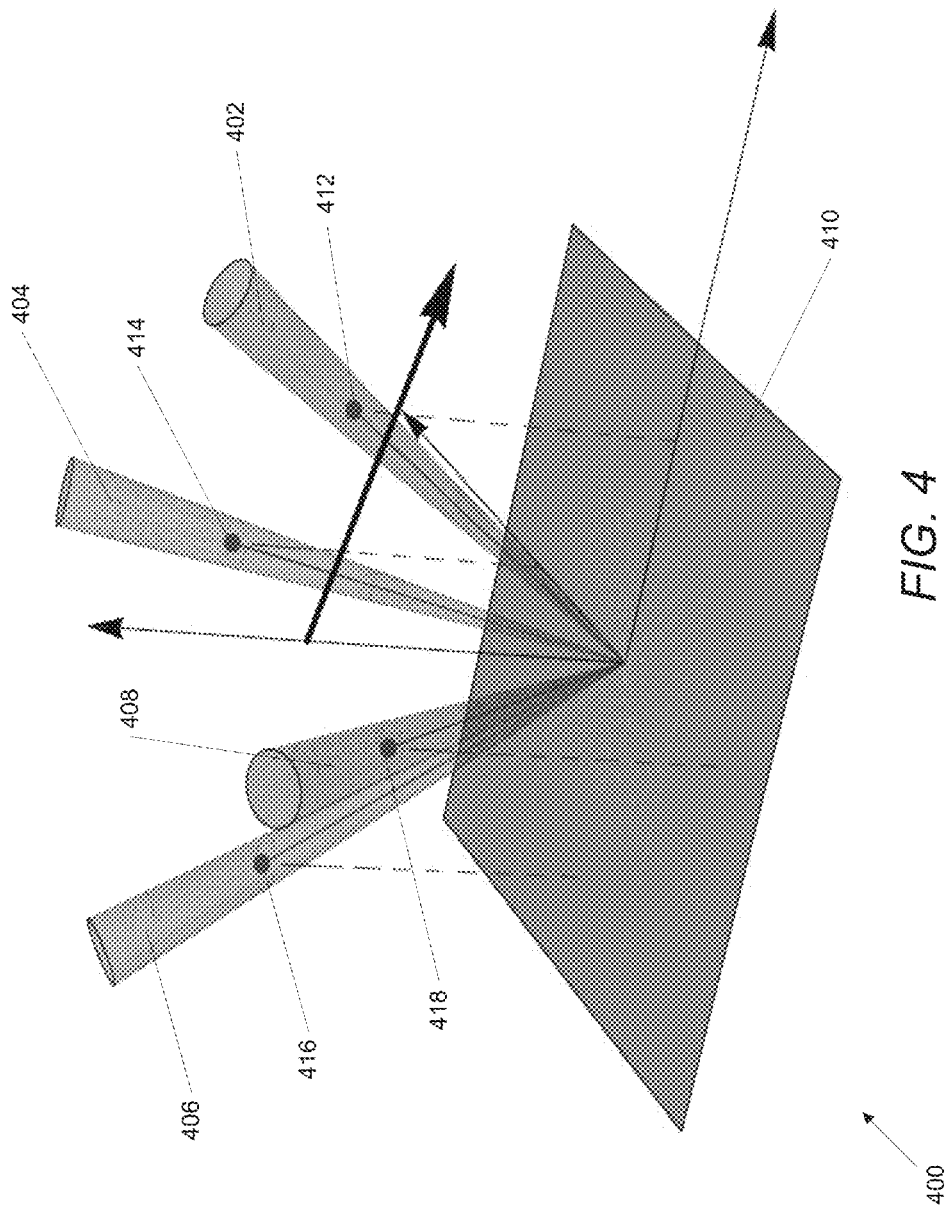
FIG. 4 conceptually illustrates 4 radar beams and respective illuminated volume of wind (point representation) in accordance with an embodiment of the invention.

A 3D conceptual layout depicting 4 radar beams and illuminated volumes of CAS (represented by a point) in accordance with an embodiment of the invention is illustrated in FIG. 4. The layout 400 includes 4 radar beams 402, 404, 406, 408 that are titled up from the horizontal 410. The layout further includes CAS 412, 414, 416, 418 illuminated by the transmit signals and located within each radar beam.

Although specific processes for configuring radar beams are discussed above with respect to FIG. 3, any of a variety of processes for configuring radar beams as appropriate to the requirements of a specific application can be utilized in accordance with embodiments of the invention. Processes for estimating wind velocity when the radar remains stationary and/or pointed north in accordance with embodiments of the invention are further discussed below.

Estimating a Wind Velocity Vector Using a Stationary Radar

In many embodiments of the invention, the radar can be stationary or moving while the system is in operation. In several embodiments of the invention, the system utilizes a four radar beam configuration where four observed beam velocities $(V_1, V_2, V_3, V_4)$ are calculated using Doppler shift calculations as discussed above. In order to estimate the wind velocity vector $V_{wind}=(v_x, v_y, v_z)$ at an altitude of interest, from the four observed beam velocities $(V_1, V_2, V_3, V_4)$ at that altitude, a generalized relationship between the observed beam velocities, vector velocity of the radar, and vector velocity of the wind, and the direction that the radar is pointing can be derived.

The relationship can be derived from the observation that a Doppler shift measured on a velocity scale is proportional to the time rate of change of the length of propagation path measured along the radar beam from the radar location to the volume of wind illuminated by the radar. At time t=0, the radar is assumed to be located at a point O=(0,0,0) and an illuminated volume of wind is located at the vector location $R_{rw}$ measured with respect to O. The radar and wind are respectively moving with velocities $V_{radar}$ and $V_{wind}$. At a short time t later the radar is located at the point $V_{radar}t$ and the illuminated volume of the wind is located at the point $R_{rw}+V_{wind}t$. The distance between these two points is given by the equation:

$$L(t)=[(R_{rw}+V_{wind}t-V_{radar}t)*(R_{rw}+V_{wind}t-V_{radar}t)]^{1/2}$$

The observed Doppler velocity at time t=0 can be calculated:

$$V_{obs} = -\left[\frac{dL(t)}{dt}\right]_{t=0}$$

Where $V_{obs}$ can be shown to be:

$$V_{obs} = (V_{radar} - V_{wind}) * \frac{R_{rw}}{|R_{rw}|}$$

A radar system that makes wind velocity measurements on four radar beams where the four radar beams point in the directions as described by:

$$\vec{\eta}_{rw} = \frac{R_{rw}}{|R_{rw}|} = (\sin(\Psi_r + \phi_i)\cos\theta, \cos(\Psi_r + \phi_i)\cos\theta, \sin\theta),$$

for $i = 1, 2, 3, 4$ where $\Psi_r$ is the azimuthal orientation of the radar measured clockwise from north, $\theta$ is the tilt angle of the radar from the horizontal and the $\phi_i$ is the radar beam steering angle in the horizontal plane relative to the direction of the radar in a clockwise sense.

Figure 5:
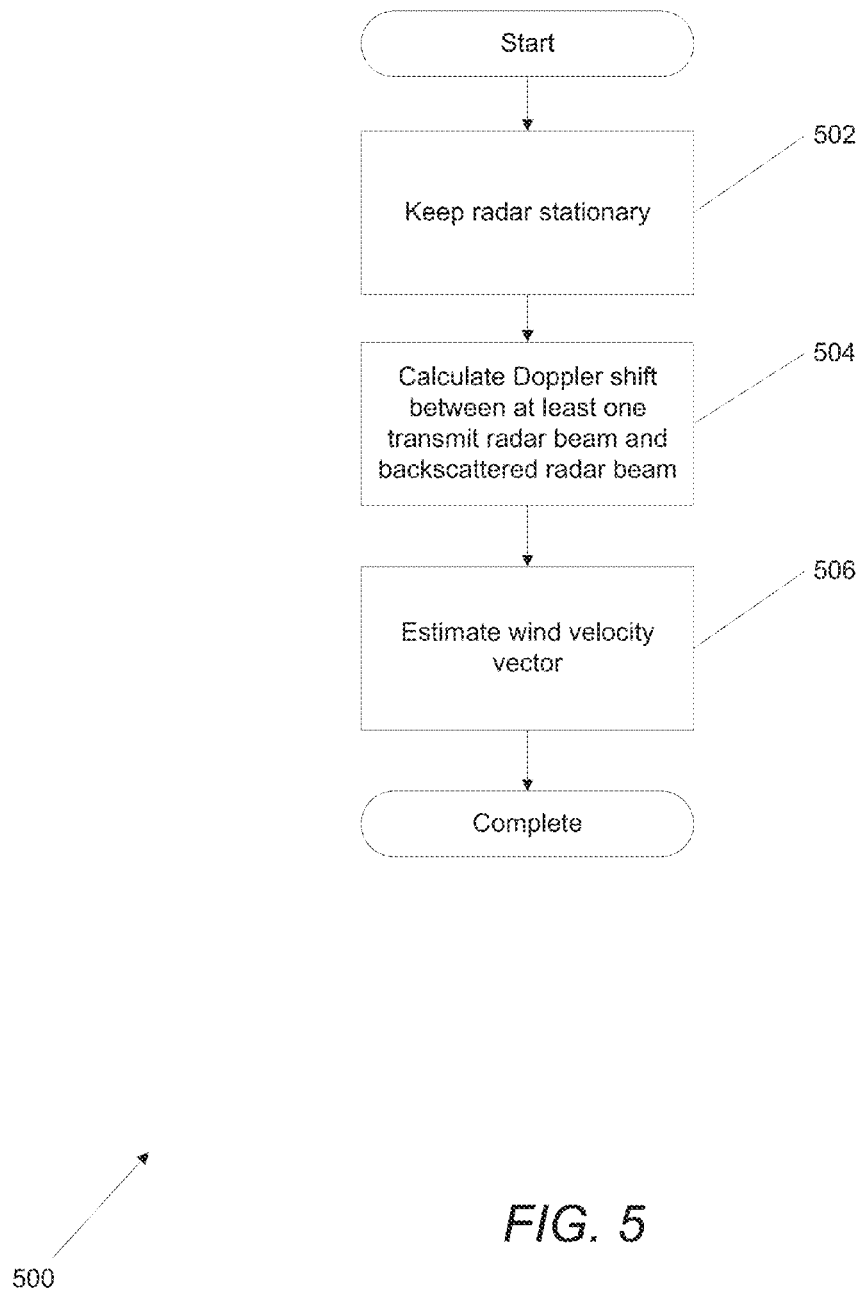
FIG. 5 is a flow chart illustrating a process for estimating a wind velocity vector under stationary radar conditions in accordance with an embodiment of the invention.

In many embodiments, the radar can be stationary. A process for estimating a wind velocity vector in the absence of radar motion is illustrated in FIG. 5. The process 500 includes keeping the radar stationary (502) and calculating the Doppler shift using the transmit radar beam and backscattered radar beam for each $i^{th}$ radar beam up to n radar beams such that:

$$V_i = -\sin(\Psi_r+\phi_i)\cos\theta v_x - \cos(\Psi_r+\phi_i)\cos\theta v_y - \sin\theta v_z, \text{ for}$$
$$i=1,2,\ldots,n$$

The process further includes estimating (506) the wind velocity vector. The wind velocity vector $V_{wind}$ can be estimated using the Doppler shift by utilizing the following technique as applied to n number of radar beams (for illustrative purposes only the technique is detailed for 4 radar beams). In the case of 4 radar beams on which the velocities $V_1$, $V_2$, $V_3$, $V_4$ are observed at an altitude of interest, the above equation for Doppler shift calculations create a system of linear equations (4 linear equations with the same set of unknown variables $v_x$, $v_y$, $v_z$). The system of linear equations can be written in matrix equation form:

$$\begin{bmatrix} -\sin(\Psi_r + \phi_1)\cos\theta & -\cos(\Psi_r + \phi_1)\cos\theta & \sin\theta \\ -\sin(\Psi_r + \phi_2)\cos\theta & -\cos(\Psi_r + \phi_2)\cos\theta & \sin\theta \\ -\sin(\Psi_r + \phi_3)\cos\theta & -\cos(\Psi_r + \phi_3)\cos\theta & \sin\theta \\ -\sin(\Psi_r + \phi_4)\cos\theta & -\cos(\Psi_r + \phi_4)\cos\theta & \sin\theta \end{bmatrix} \begin{bmatrix} v_x \\ v_y \\ v_z \end{bmatrix} = \begin{bmatrix} V_1 \\ V_2 \\ V_3 \\ V_4 \end{bmatrix}$$

which can be rewritten in a more compact form:

$$AV_{wind} = V_{obs}$$

In many embodiments, the above equation can be solved using the method of least squares for the wind velocity vector $V_{wind} = (v_x, v_y, v_z)$. In matrix notation the solution becomes:

$$V_{wind} = [A^T A]^{-1} A^T V_{obs}$$

Provided that the radar is oriented to the North, then the wind velocity vector $V_{wind} = (v_x, v_y, v_z)$ can be estimated by:

$$v_x = \frac{1}{2\cos\theta}(V_4 - V_2),$$

$$v_y = \frac{1}{2\cos\theta}(V_3 - V_1),$$

$$v_z = -\frac{1}{2\sin\theta}(V_1 + V_2 + V_3 + V_4)$$

If the observed velocities $(V_1, V_2, V_3, V_4)$ are estimated to an accuracy defined by a diagonal covariance matrix:

$$M_{obs} = \text{diag}(\sigma_1^2, \sigma_2^2, \sigma_3^2, \sigma_4^2)$$

then the weighted least squares solution for the wind velocity vector can be provided by:

$$V_{wind} = [A^T W A]^{-1} [A^T W] V_{obs}$$

$$W = [M_{obs}]^{-1}$$

where the covariance of the wind velocity vector is given by:

$$M_{wind} = [A^T W A]^{-1}$$

and the diagonal elements of $M_{wind}$ are the variances of the wind velocities $(v_x, v_y, v_z)$.

Although specific processes for estimating a wind velocity vector in the absence of radar motion are discussed above with respect to FIG. 5, any of a variety of processes for estimating a wind velocity vector in the absence of radar motion as appropriate to the requirements of a specific application can be utilized in accordance with embodiments of the invention. Processes for generating range-velocity matrices in accordance with embodiments of the invention are further discussed below.

Formation of Range-Velocity Matrices

Figure 6:
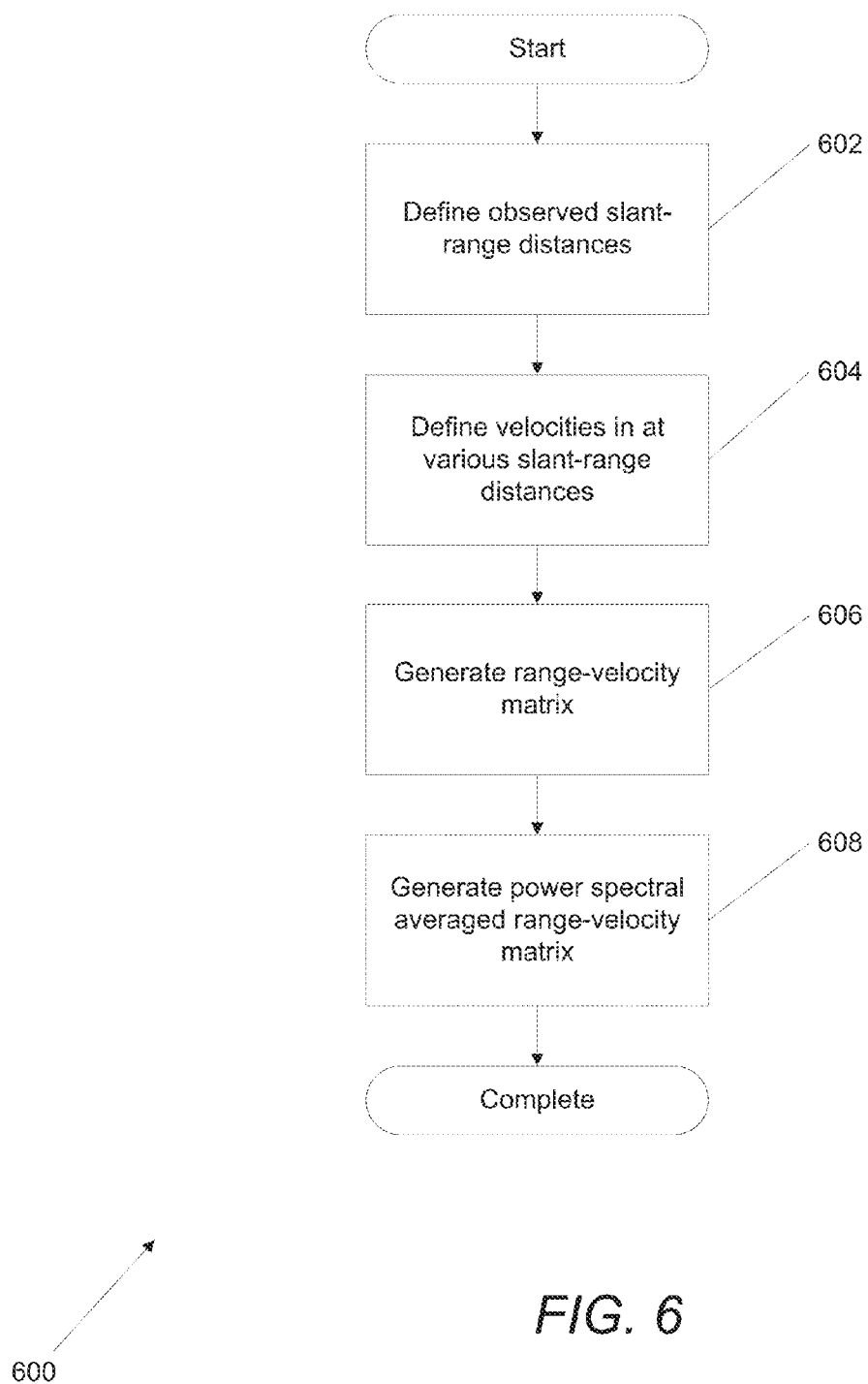
FIG. 6 is a flow chart illustrating a process for generating range-velocity matrices in accordance with an embodiment of the invention.

In many embodiments, the system can estimate the range and Doppler shift of a CAS by using a form of fast-time slow-time processing that produces a range-velocity matrix. In many embodiments, the range-velocity matrix $C_{rq}$ can be defined corresponding to various slant-range distances from a radar. A process for generating a range-velocity matrix in accordance with an embodiment of the invention is illustrated in FIG. 6. The process 600 includes defining observed slant-ranges away from the radar in the atmosphere. In many embodiments of the invention, the observed slant-range $\rho_r$ is defined such:

$$\rho_r = r\frac{c}{2B},$$

$$r = 0, 1, 2, \ldots, NFFT/2$$

where c is the speed of light and B is the radar sweep width. The process further includes defining a velocity $v_q$ corresponding to each slant-range. In several embodiments, the velocities $v_q$ can be defined by:

$$v_q = v_{min} + q\frac{1}{Q-1}\left(\frac{\lambda}{2_c T_m}\right),$$

$$q = 0, 1, 2, \ldots, Q-1$$

where $\lambda = c/f_c$ is the wavelength of the radar carrier frequency. Further, the altitude above ground level corresponding to the slant range $\rho_r$ can be calculated:

$$z_r = z_0 + \rho_r/\sin\theta$$

where $\lambda = c/f_c$ is the radar elevation above ground level. The process further includes generating (606) a range-velocity matrix $C_{rq}$. In many embodiments, the range-velocity matrix $C_{rq}$ can be defined by:

$$C_{rq} = \frac{1}{\sqrt{Q}} \sum_{n=0}^{Q-1} wgt_n B_m e^{i2\pi rn/Q},$$

$$q = 0, 1, 2, \ldots, Q-1$$

where:

$$B_m = \frac{1}{\sqrt{NFFT}} \sum_{m=0}^{NFFT-1} wgt_m A_{mn} e^{i2\pi mn/NFFT},$$

$$r = 0, 1, 2, \ldots, NFFT/2$$

where $A_{mn}$ is a matrix of data points with slow time index rows and fast time index columns.

Echoes from strong reflectors can be relatively easy to detect in the range-velocity matrix $C_{rq}$. However, weaker reflections such as those from CAS and weather events may need more processing gain for detection. The process further includes generating (608) a power spectral averaged range-velocity matrix $P_{rq}$ such that:

$$P_{rq} = \frac{1}{N_{avg}} \sum_{k=1}^{N_{avg}} |C_{rq}(k)|^2$$

where k corresponds to a time step of length, $QT_m$ equal to the time duration of a data stack. In many embodiments, the averaging used to generate the power averaged range-velocity matrix $P_{rq}$ is performed without overlap in time order to maintain statistical independence. The averaging can reduce the variance of the background noise in the image and allows for more reliable spectral estimation.

Although specific process for generating a range-velocity matrix are discussed above with respect to FIG. 6, any of a variety of processes for generating range-velocity matrices as appropriate to the requirements of a specific application can be utilized in accordance with embodiments of the invention. Processes for estimating radar beam Doppler shift velocities in accordance with an embodiment of the invention are discussed further below.

Estimation of Radar Beam Doppler Shift Velocity at an Altitude of Interest

Figure 7:
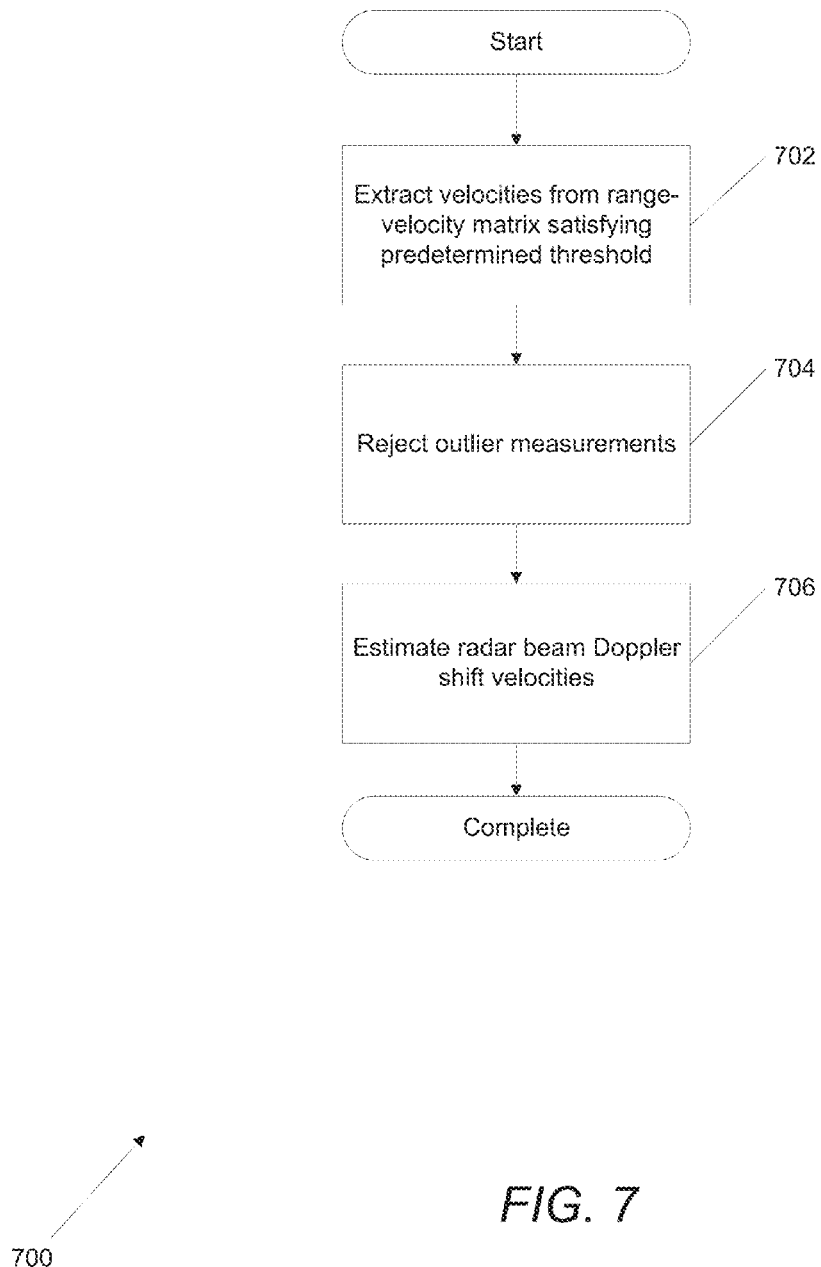
FIG. 7 is a flow chart illustrating a process for estimating the radar beam Doppler shift velocity using a range-velocity matrix in accordance with an embodiment of the invention.

Radar beam Doppler shift velocities at an altitude of interest can be estimated using a range-velocity matrix. In many embodiments, a power averaged range-velocity matrix $P_{rq}$ can be utilized. A process for estimating radar beam Doppler shift velocity at an altitude of interest in accordance with an embodiment of the invention is illustrated in FIG. 7. The process 700 includes extracting (702) all velocities $v_1$, $v_2, \ldots, v_N$ with corresponding velocity indexes $q_1, q_2, \ldots, q_N$, a at a slant-range distance corresponding to the velocity index r from the range-velocity matrix $P_{rq}$ that satisfies:

$$10 \log_{10}[P_{rq}/\text{Median}(P_{rq})] > K$$

where K is a predetermined threshold. In many embodiments, K is chosen to be 2 dB. In several embodiments, smaller values of K can be used if the range velocity matrix $P_{rq}$ was formed with $N_{avg} > 150$.

Due to the turbulent nature of the Ka-band clear air scatter, the observed velocity cannot be reliably estimated by calculating:

$$V_{obs} = \bar{v} = \frac{1}{N}\sum_{n=1}^{N} v_n$$

due to the presence of high velocity outliers. In order to reject these outliers, a Bayesian approach can be taken. In many embodiments, the velocity $v_g$ is upon initial information I can be assumed to be normally distributed with probability density function:

$$p(q \mid I) \propto \exp\left[\frac{-(q-Q_c)^2}{2\sigma_0^2}\right]$$

where $q = 0, 1, \ldots, Q-1$, and $Q_c = Q/2$ is the center velocity index corresponding to zero velocity and $\sigma_0 = 4Q_c$. This choice of parameters produces an initial velocity distribution that is very nearly uniformly distributed with a slight central tendency towards zero velocity. The symbol $\propto$ in the foregoing equations indicates a probability distribution that is determined within a simple multiplicative constant. In several embodiments, the constant can be $C_0 = 1/(\sqrt{2\pi}\sigma_0)$.

Bayes theorem states that when an observed velocity $v_n$ with corresponding velocity index $q_n$ from the data $v_1$, $v_2, \ldots, v_N$, the posterior velocity distribution can be defined as:

$$p(q \mid q_n, I) = \frac{p(q_n \mid q_n, I)p(q \mid I)}{\sum_{q=1}^{Q} p(q_n \mid q_n, I)p(q \mid I)}$$

In order to reject (704) outlier measurements in the posterior distribution the likelihood of the data $p(q_n \mid q, I)$ is chosen to be:

$$p(q_n \mid q, I) \propto \left[1 + \frac{(q-q_n)^2}{2\beta\sigma_1^2}\right]^{-\beta}$$

where $\beta = 1$ and $\sigma_1 = 10(Q/256)$. The posterior distribution due to all the data is:

$$p(q \mid q_1, q_2, \ldots, q_N, I) \propto \exp\left[\frac{(q-Q_c)^2}{2\sigma_0^2}\right]\prod_{n=1}^{N}\left[1 + \frac{(q-q_n)^2}{2\beta\sigma_1}\right]^{-\beta}$$

The radar beam Doppler shift velocities can be estimated (706) via:

$$V_{obs} = v_{min} + \bar{q}\frac{(v_{max} - v_{min})}{Q-1}$$

where $\bar{q}$ is the mean of the posterior probability distribution.

Although specific processes for estimating radar beam Doppler shift velocities at an altitude of interest are discussed above with respect to FIG. 7, any of a variety of processes for estimating a radar beam Doppler shift velocity at an altitude of interest as appropriate to the requirements of a specific application can be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A wide band Doppler radar system comprising:
   an antenna assembly comprising at least one transmit antenna and at least one receive antenna, where:
   each of the at least one transmit antenna is configured to transmit a radar beam comprising a transmit signal on a Ka-band carrier frequency; and
   each of the at least one receive antenna is configured to receive a backscattered radar beam comprising a carrier frequency that is frequency shifted relative to the transmitted Ka-band carrier frequency of the backscattered radar beam;
   a transceiver connected to the antenna assembly configured to:
   transmit a radar beam comprising a transmit signal on a Ka-band carrier frequency using each of the at least one transmit antenna; and
   receive a backscattered radar beam comprising a carrier frequency that is frequency shifted relative to the transmitted Ka-band carrier frequency of the backscattered radar beam using each of the at least one receive antenna; and a data acquisition system connected to the transceiver configured to estimate a wind velocity vector in clear air conditions by calculating a Doppler shift between at least one transmitted radar beam and at least one received backscattered radar beam.

2. A wide band Doppler radar system of claim 1, wherein the antenna assembly further comprises a horn antenna having waveguide flanges.

3. A wide band Doppler radar system of claim 1, wherein the transceiver operates between 33.3 GHz and 33.5 GHz.

4. A wide band Doppler radar system of claim 1, wherein the transceiver operates as a frequency modulated continuous wave (FMCW) radar.

5. A wide band Doppler radar system of claim 1, wherein the antenna assembly further comprises 4 transmit antennas.

6. A wide band Doppler radar system of claim 5, wherein the antenna assembly further comprises 4 receive antennas.

7. A wide band Doppler radar system of claim 5, wherein the transceiver connected to the antenna assembly is further configured to transmit radar beams that separated by 90 degrees in azimuth.

8. A wide band Doppler radar system of claim 7, wherein the transceiver connected to the antenna assembly is further configured to transmit radar beams that tilted 80 degrees up from the horizontal.

9. A wide band Doppler radar system of claim 7, wherein the data acquisition system is configured to determine the wind velocity vector from the Doppler shift based on the velocities, $V_i$ of the transmitted and received backscattered radar beams transmitted where i is the number of the radar beam and where:

$$V_i = -\sin(\Psi_r + \phi_i)\cos\theta v_x - \cos(\Psi_r + \phi_i)\cos\theta v_y - \sin\theta v_z$$

where $\Psi_r$ is the azimuthal orientation of the radar beam, $\phi_i$ is the radar beam steering angle, and $\theta$ is the tilt angle of the radar relative to the horizontal.

10. A wide band Doppler radar system of claim 9, wherein the data acquisition system is configured to determine the wind velocity vector $$V_{wind} = (v_x, v_y, v_z)$$

from the Doppler shift based on transmitted and received backscattered radar beams transmitted where:

$$v_x = \frac{1}{2\cos\theta}(V_4 - V_2)$$

$$v_y = \frac{1}{2\cos\theta}(V_3 - V_1)$$

$$v_z = -\frac{1}{2\sin\theta}(V_1 + V_2 + V_3 + V_4)$$

where $V_1, V_2, V_3$ and $V_4$ are radar beam velocities and $\theta$ is the tilt angle of the radar relative to the horizontal.

11. A method of estimating wind speed and direction using a wide band Doppler radar system comprising:
configuring at least one transmit antenna to transmit a radar beam comprising a transmit signal on a Ka-band carrier frequency;
configuring at least one receive antenna too receive a backscattered radar beam comprising a carrier frequency that is frequency shifted relative to the transmitted Ka-band carrier frequency of the backscattered radar beam;
transmitting a radar beam comprising a transmit signal on a Ka-band carrier frequency using each of the at least one transmit antenna;
receiving a backscattered radar beam comprising a carrier frequency that is frequency shifted relative to the transmitted Ka-band carrier frequency of the backscattered radar beam using each of the at least one receive antenna; and
estimating a wind velocity vector by calculating a Doppler shift between at least one transmitted radar beam and at least one received backscattered radar beam.

12. A method of claim 11, wherein the at least one the transmit antenna and the at least one receive antenna are parts of a horn antenna having waveguide flanges.

13. A method of claim 11, wherein transmitting a radar beam comprising a transmit signal on a Ka-band carrier frequency further comprises operating between 33.3 GHz and 33.5 GHz.

14. A method of claim 11, wherein transmitting a radar beam comprising a transmit signal on a Ka-band carrier frequency further comprises generating a continuous wave.

15. A method of claim 11, wherein configuring at least one transmit antenna to transmit a radar beam further comprises configuring 4 transmit antennas.

16. A method of claim 15, wherein configuring at least one receive antenna too receive a backscattered radar beam further comprises configuring 4 receive antennas.

17. A method of claim 16, wherein the radar beams are separated by 90 degrees in azimuth.

18. A method of claim 17, wherein the radar beams are tilted 80 degrees up from the horizontal.

19. A method of claim 17, wherein the transmitting and receiving are performed at a single location.

20. A method of claim 19, wherein the estimation is calculated from a transmitted radar beam transmitted in the direction of true north.

* * * * *